US007929430B2

(12) United States Patent
Oh et al.

(10) Patent No.: US 7,929,430 B2
(45) Date of Patent: Apr. 19, 2011

(54) CONGESTION CONTROL ACCESS GATEWAY AND CONGESTION CONTROL METHOD FOR THE SAME

(75) Inventors: Hyun Woo Oh, Daejeon (KR); Kee Seong Cho, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 460 days.

(21) Appl. No.: 11/607,505

(22) Filed: Nov. 30, 2006

(65) Prior Publication Data

US 2007/0127381 A1 Jun. 7, 2007
US 2007/0237083 A9 Oct. 11, 2007

(30) Foreign Application Priority Data

Dec. 2, 2005 (KR) ........................ 10-2005-0117151

(51) Int. Cl.
*H04L 12/26* (2006.01)
*G08C 15/00* (2006.01)
(52) U.S. Cl. ........................ 370/229; 370/235
(58) Field of Classification Search .......... 370/229–236, 370/448
See application file for complete search history.

(56) References Cited

U.S. PATENT DOCUMENTS

| | | | | |
|---|---|---|---|---|
| 5,696,764 A | * | 12/1997 | Soumiya et al. | 370/395.41 |
| 7,020,701 B1 | * | 3/2006 | Gelvin et al. | 709/224 |
| 7,688,731 B2 | * | 3/2010 | Haumont et al. | 370/235 |
| 2001/0038610 A1 | * | 11/2001 | Decker et al. | 370/230 |
| 2002/0146032 A1 | * | 10/2002 | Attimont et al. | 370/448 |
| 2003/0043742 A1 | * | 3/2003 | De Maria et al. | 370/230 |
| 2003/0076781 A1 | * | 4/2003 | Enomoto et al. | 370/229 |
| 2003/0174689 A1 | * | 9/2003 | Fujino | 370/349 |
| 2004/0153694 A1 | * | 8/2004 | Nicholson et al. | 714/4 |
| 2007/0133405 A1 | * | 6/2007 | Bowra et al. | 370/230 |

FOREIGN PATENT DOCUMENTS

KR 10-2001-0056286 7/2001

* cited by examiner

*Primary Examiner* — Jason E Mattis
*Assistant Examiner* — Stephen J Clawson
(74) *Attorney, Agent, or Firm* — Ladas & Parry LLP

(57) ABSTRACT

A congestion control access gateway and a congestion control method for the same are provided. The congestion control access gateway interfaces between a broadband convergence network and a ubiquitous sensor network including sensors and terminals. The congestion control access gateway receives data from the ubiquitous sensor network. When a congestion situation has occurred, the congestion control access gateway detects the congestion situation based on data received in the congestion situation and broadcasts congestion notification and control messages in response to the congestion situation detection. The congestion control access gateway generates a congestion situation detection profile as a result of the congestion situation detection and performs priority queuing of the received data based on the congestion situation detection profile and service classes. The congestion control access gateway determines destination of the queued data using the congestion situation detection profile and routes the data to a corresponding service.

12 Claims, 4 Drawing Sheets

CONGESTION CONTROL ACCESS GATEWAY AND CONGESTION CONTROL METHOD FOR THE SAME

RELATED APPLICATION

The present application is based on, and claims priority from, Korean Application Number 10-2005-117151, filed Dec. 2, 2005, the disclosure of which is incorporated by reference herein in its entirety.

BACKGROUND OF THE INVENTION

1. Field of the Invention

The present invention relates to a ubiquitous system in which computers are present anywhere, and more particularly to a congestion control access gateway, which interfaces between a Broadband convergence Network (BcN) and a Ubiquitous Sensor Network (USN) including a variety of sensors and terminals and controls a congestion situation in the ubiquitous system, and a congestion control method for the congestion control access gateway.

2. Description of the Related Art

A conventional end-to-end feedback congestion control method can detect and control congestion of terminal nodes only. When congestion occurs, this method cannot immediately deal with the congestion due to a control time required for the transmitter to detect the congestion after the congestion occurs.

A conventional TCP congestion control method requires a longer time to control congestion as the delay time between receiving and transmitting sides increases. In addition, this method may worsen congestion in a high bandwidth network due to packets, which have already been transmitted, until the congestion is detected and a certain process is initiated.

In ubiquitous environments, a variety of sensors may randomly transmit variable-sized data to cause congestion situations. The conventional methods have not taken into consideration these congestion situations and also have not taken into consideration a new environment in which storage features are embedded even in very small sensors along with development of storage technologies.

A congestion control method for a V 5.2 system in an access network was disclosed in Korean Patent Application Publication No. 2001-0056286 (published on Jul. 4, 2001). This method performs congestion control in the following manner. For example, when a congestion situation, in which any more time slots cannot be assigned to a V5.2 link from an access network to a local exchange, has occurred, a threshold congestion level is calculated based on provisioned concentration information, it is detected whether or not the congestion situation has exceeded the threshold congestion level, and a congestion notification signal is transferred to a call sender when the congestion situation has exceeded the threshold congestion level. In this method, if there is no time slot available when attempting call connection using a telephone line, it is determined that a congestion situation has occurred, and a standby request signal is transmitted to the sender, thereby controlling the congestion. However, this congestion control method is not suitable for congestion situations that occur when a variety of wired/wireless sensors randomly transmit variable-sized sensed data.

In a ubiquitous environment in which a very large number of types of sensors are provided, data congestion may occur in abnormal situations such as incidents, accidents, disasters, public performances, and events. For example, if a fire breaks out in a building, not only sensors such as temperature, gas, and wind sensors but also a variety of devices such as mobile phones, cameras, and display devices will transmit data in response to the fire, thereby causing data congestion in a gateway that interfaces between a Broadband convergence Network (BcN) and a Ubiquitous Sensor Network (USN). The conventional congestion control methods have not taken into consideration these congestion situations, which occur when the variety of sensors in the ubiquitous environment randomly transmit variable-sized data, and also have not taken into consideration a new environment in which storage features are embedded even in very small sensors along with development of storage technologies.

SUMMARY OF THE INVENTION

Therefore, the present invention has been made in view of the above problems, and it is an object of the present invention to provide a congestion control access gateway and a congestion control method for the same, which can effectively control congestion situations caused by random transmission of data from a ubiquitous sensor network in a ubiquitous environment.

In accordance with one aspect of the present invention, the above and other objects can be accomplished by the provision of a congestion control method for a congestion control access gateway that interfaces between a broadband convergence network and a ubiquitous sensor network including sensors and terminals, the method comprising: receiving data from the ubiquitous sensor network; when receiving the data, determining whether or not a congestion situation has occurred; when a congestion situation has occurred, detecting the congestion situation based on data received in the congestion situation; broadcasting a congestion notification message and a congestion control message in response to the detection of the congestion situation; generating a congestion situation detection profile as a result of the congestion situation detection; performing priority queuing of the received data based on the congestion situation detection profile and predetermined service classes; and determining a destination of the data, which has been subjected to the priority queuing, using the congestion situation detection profile, and routing the data to a corresponding service.

In accordance with another aspect of the present invention, there is provided a method for a terminal to control a congestion situation occurring in a ubiquitous system including a plurality of congestion control access gateways that interface between a broadband convergence network and a ubiquitous sensor network including sensors and terminals, the method comprising: receiving a congestion notification message and a congestion control message from a specific congestion control access gateway that has generated the congestion notification and control messages in response to detection of a congestion situation; storing data produced in the congestion situation upon receiving the congestion notification message; performing random back-off of each service class upon receiving the congestion control message; and transmitting part of the stored data based on a rate at which the data is stored.

In accordance with yet another aspect of the present invention, there is provided a congestion control access gateway that interfaces between a broadband convergence network and a ubiquitous sensor network including sensors and terminals, the gateway comprising: a first interface that interfaces with the ubiquitous sensor network and receives data therefrom; a congestion detector that monitors the first interface to determine whether or not a congestion situation has occurred and, when a congestion situation has occurred, detects the congestion situation; a situation detection processor that generates a congestion situation detection profile as a result of the detection of the congestion situation based on the received data; a congestion controller that broadcasts a congestion notification message and a congestion control message in response to the detection of the congestion situation and transmits the congestion situation detection profile to a neighboring congestion control access gateway; a priority queuing processor that performs priority queuing of the received data using the congestion situation detection profile and predetermined service classes; a routing processor that determines a destination of the data, which has been subjected to the priority queuing, using the congestion situation detection profile, and routes the data to a corresponding service; and a second interface that interfaces with the broadband convergence network and transmits the routed data thereto.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
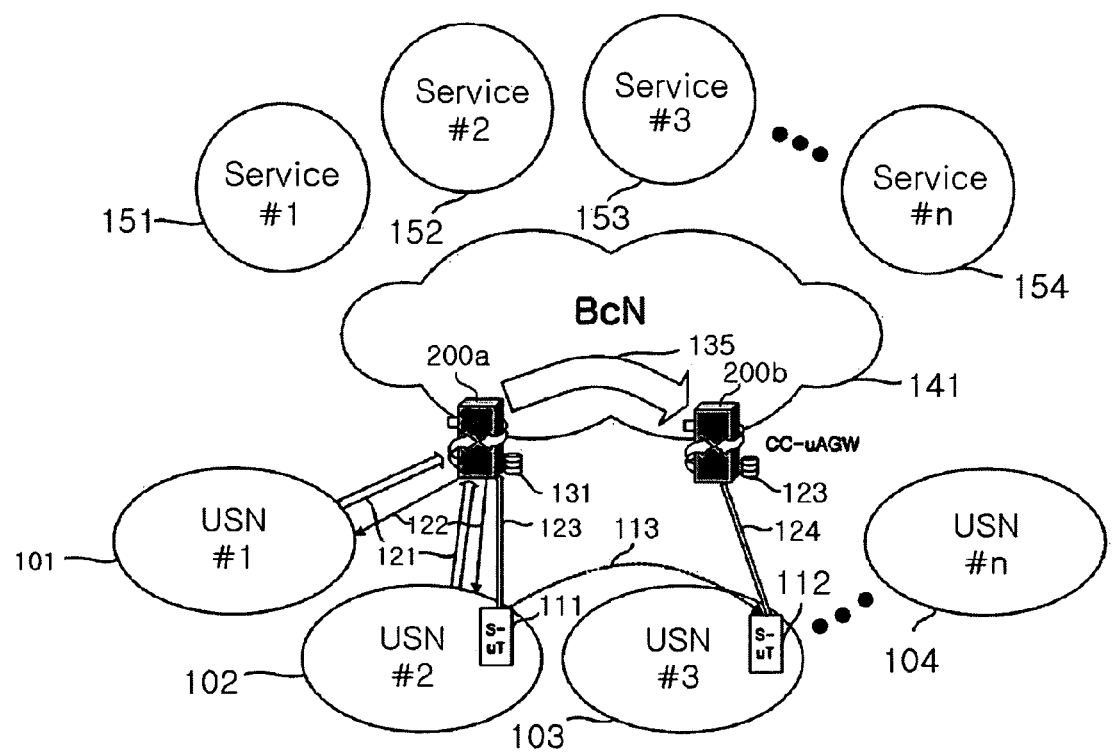
FIG. 1 is a block diagram of a congestion control access gateway that interfaces between a Ubiquitous Sensor Network (USN) and a Broadband convergence Network (BcN) in a ubiquitous system according to an embodiment of the present invention.

Now, preferred embodiments of the present invention will be described in detail with reference to the accompanying drawings. In the drawings, the same or similar elements are denoted by the same reference numerals even though they are depicted in different drawings. In the following description of the present invention, a detailed description of known functions and configurations incorporated herein will be omitted when it may obscure the subject matter of the present invention.

According to the present invention, situation detection is performed based on variable-sized data sensed and transmitted by a variety of sensors, and a situation detection profile is generated. A route to the destination of the sensed data is determined based on the situation detection profile, and congestion control is performed in response to the congestion situation detection. A congestion control access gateway according to embodiments of the present invention, which performs congestion control in this manner, will now be described in detail with reference to the accompanying drawings.

FIG. 1 is a block diagram of a congestion control access gateway that interfaces between a Ubiquitous Sensor Network (USN) and a Broadband convergence Network (BcN) in a ubiquitous system according to an embodiment of the present invention.

As shown in FIG. 1, the ubiquitous system includes congestion control access gateways 200a and 200b (also collectively denoted by "200" as in FIG. 2) that interface between a Broadband convergence Network (BcN) 141 and ubiquitous sensor networks (USNs) 101, 102, 103, and 104 that include a variety of sensors and terminals 111 and 112.

The congestion control access gateway 200 is a system that processes congestion data while routing data received from a large number of various sensors and terminals in a ubiquitous environment in which computers are present anywhere. The congestion control access gateway 200 is also referred to as a congestion control USN access gateway (CC-uAGW).

The variety of sensors and terminals 111 and 112 may be present anywhere in the USNs 101, 102, 103, and 104. The terminals (or sensors) 111 and 112 present in the USNs 101 to 104 can connect to the broadband convergence network 141 through the congestion control access gateway 200 and can receive a variety of services 151, 152, 153, and 154 that service providers provide through the broadband convergence network 141.

Data sensed and input through the variety of sensors and terminals present in the USNs 101 to 104 is transmitted to the broadband convergence network 141 through the congestion control access gateway 200 and is then transferred to a variety of application services connected to the broadband convergence network 141 so that the data is used to provide the services.

As shown in FIG. 1, the USN#1 101 and the USN#2 102 are connected to the same congestion control access gateway 200a. A variety of sensors present in the USN#1 101 and the USN#2 102 transmit sensed data to the congestion control access gateway 200a. The congestion control access gateway 200a performs situation detection based on the data received from the USN#1 101 and the USN#2 102 and generates a situation detection profile as a result of the situation detection. The congestion control access gateway 200a determines a destination of the data received from the USN#1 101 and the USN#2 102 based on the situation detection profile and routes the data to a corresponding service in the broadband convergence network 141.

When a specific situation has occurred in the USN#1 101 and the USN#2 102 during such a routing process, the variety of sensors and terminals 111 present in the USN#1 101 and the USN#2 102 randomly transmit data sensed and input in the specific situation to the congestion control access gateway 200a as in process 121.

While monitoring an interface with the USNs 101 and 102, the congestion control access gateway 200a detects congestion due to a rapid increase in the data reception rate. Upon detecting the congestion, the congestion control access gateway 200a immediately starts priority queuing of currently processed data based on predetermined service classes, and performs situation detection based on the data received in the congestion situation and generates a congestion situation detection profile as a result of the situation detection. Upon detecting the congestion situation, the congestion control access gateway 200a broadcasts a congestion notification message and a congestion control message as in process 122, and transmits the generated congestion situation detection profile to its neighboring congestion control access gateway 200b as in process 135.

Each terminal (specifically, sensor-Ubiquitous terminal (S-uT)) 111 in the USNs 101 and 102, which includes a storage therein, receives the congestion notification message and stores data sensed and input thereafter in the storage. The terminal 111 receives the congestion control message and sets a random back-off time for each service class. The terminal 111 periodically determines whether or not the congestion situation has been released, and transmits the stored data to the congestion control access gateway 200a taking into consideration a data storage rate of the storage (i.e., the rate at which data is stored in the storage) as in process 123. Accordingly, the terminal 111 can balance load of the data to be transmitted to the congestion control access gateway 200a.

The neighboring congestion control access gateway 200b receives the congestion situation detection profile from the congestion control access gateway 200a. The neighboring congestion control access gateway 200b receives the stored data transmitted by the terminal 111 that has moved to its service area, and determines a destination of the received data based on the congestion situation detection profile and routes the received data to the destination. That is, when the terminal 111 with the storage, in which the data produced in the congestion situation has been stored, has entered the service area of the neighboring congestion control access gateway 200b, the neighboring congestion control access gateway 200b connects to the terminal 111 and receives and processes the stored data from the terminal 111.

When the terminal 111, which has the storage and is present in the USN#2 102, has received the congestion notification message and the congestion control message in the congestion situation as in process 122, the terminal 111 stores sensed and input data in the storage and moves to the service area of the neighboring congestion control access gateway 200b. When the terminal 111 has entered the service area of the congestion control access gateway 200b, the terminal 111 connects to the congestion control access gateway 200b and transmits the data sensed in the congestion situation, which has been stored in the storage, to the congestion control access gateway 200b as in process 124.

The configuration of such a congestion control access gateway will now be described in detail with reference to FIG. 2.

Figure 2:
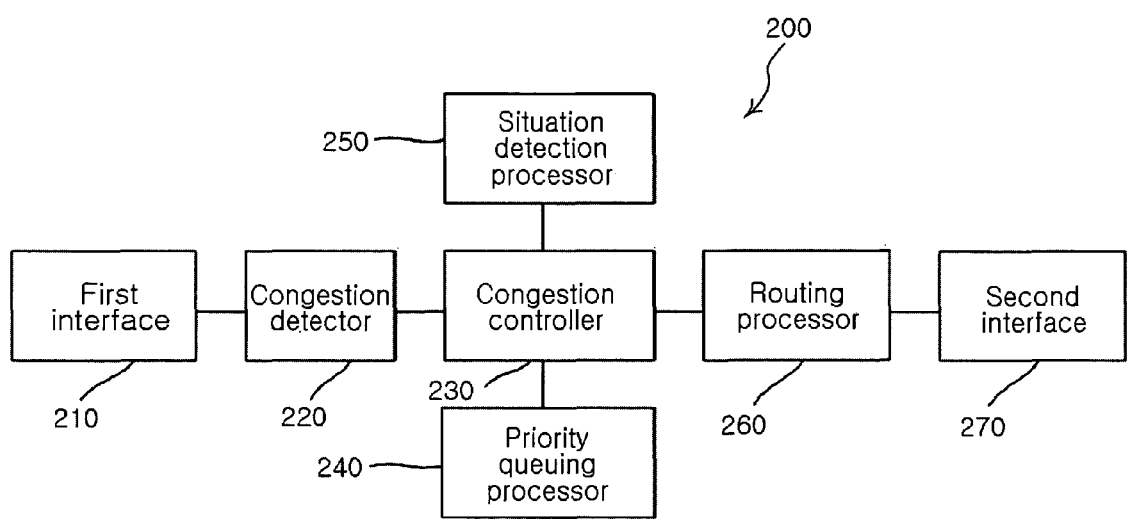
FIG. 2 is a block diagram of a congestion control access gateway that processes congestion data according to an embodiment of the present invention.

FIG. 2 is a block diagram of a congestion control access gateway that processes congestion data according to an embodiment of the present invention.

As shown in FIG. 2, the congestion control access gateway 200 includes a first interface 210, a congestion detector 220, a congestion controller 230, a priority queuing processor 240, a situation detection processor 250, a routing processor 260, and a second interface 270.

The first interface 210 interfaces with the USNs 101, 102, 103, and 104 and receives data therefrom.

The congestion detector 220 monitors the first interface 210 to detect data congestion. When data from the USNs 101 to 104 causes congestion, the congestion detector 220 detects the data congestion and notifies the congestion controller 230 of the congestion detection.

Upon receiving the congestion detection notification, the congestion controller 230 transfers data currently provided for a corresponding service and data received after the congestion detection notification to the priority queuing processor 240 and transfers the data sensed in the congestion situation to the situation detection processor 250. In response to the congestion detection, the congestion controller 230 broadcasts a congestion notification message and a congestion control message and transmits a congestion situation detection profile to the neighboring congestion control access gateway 200b. The routing processor 260 determines a destination of data popped from a priority queue based on the congestion situation detection profile and the second interface 270 then routes the data to the destination.

The priority queuing processor 240 performs priority queuing based on service classes. The priority queuing processor 240 performs both the priority queuing based on the congestion situation detection profile and the priority queuing based on the service classes.

The situation detection processor 250 performs situation detection based on data received from the USNs 101 to 104 and generates a situation detection profile as a result of the situation detection. Specifically, the situation detection processor 250 performs congestion situation detection based on data received from the USNs 101 to 104 and generates a congestion situation detection profile as a result of the congestion situation detection.

The routing processor 260 determines a destination of data received from the USNs 101 to 104 and routes the data to the destination over the broadband convergence network (BcN) 141 through the second interface 270.

Figure 3:
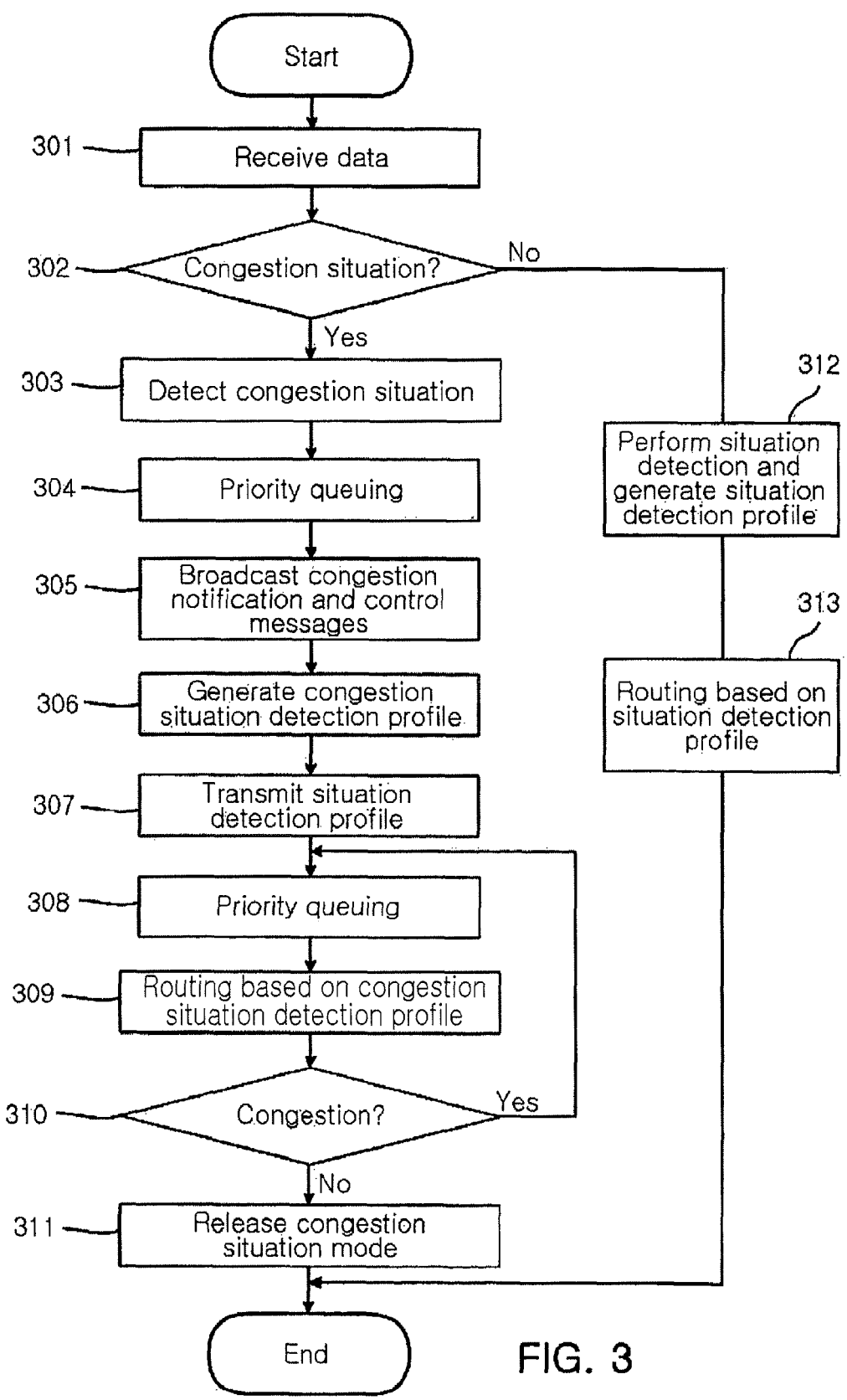
FIG. 3 is a flow chart illustrating how a congestion control access gateway performs congestion control according to an embodiment of the present invention.

With reference to FIG. 3, a detailed description will now be given of a congestion situation control method for the congestion control access gateway according to the present invention, in which situation detection is performed based on data received from a variety of terminals and sensors in the ubiquitous environment, a situation detection profile is generated as a result of the situation detection, and the received data is routed based on the generated situation detection profile. In the following description, reference numerals "200a" and "200b" rather than the collective reference numeral "200" are used to discriminate between the current and neighboring congestion control access gateways, and the congestion situation control procedure is described according to the process flow as shown in FIG. 1.

FIG. 3 is a flow chart illustrating how a congestion control access gateway performs congestion control according to an embodiment of the present invention.

As shown in FIG. 3, at step 301, the congestion control access gateway 200a interfaces with the USNs 101, 102, 103, and 104 to receive sensed and input data from sensors and terminals in the USNs 101, 102, 103, and 104.

At step 302, the congestion control access gateway 200a monitors the first interface 210, which is interfacing with the USNs 101 to 104, to determine whether or not a congestion situation has occurred. When no congestion situation has occurred, the congestion control access gateway 200a detects a non-congestion situation and generates a situation detection profile as a result of the situation detection at step 312, and determines a destination of the received data based on the situation detection profile and routes the data to a corresponding service at step 313.

On the other hand, when a specific situation has occurred in the USNs 101 to 104 so that the variety of terminals and sensors in the USNs 101 to 104 attempt to transmit a large amount of data at the same time and thus a congestion situation has occurred, the congestion control access gateway 200a detects data congestion through the congestion detector 220 at step 303. Specifically, the congestion detector 220 detects a congestion situation based on data, which the USNs 101 and 102 has produced in the congestion situation, and determines a reason for the congestion situation based on the congestion data to detect a situation such as an occurrence of a fire in a building.

Then, at step 304, the congestion control access gateway 200a starts priority queuing of currently processed data based on predetermined service classes. The predetermined service classes include a real-time multimedia data class, a non-real time multimedia data class, a real-time sensed data class, a non-real time sensed data class, and an Internet data class, which have been previously determined.

At step 305, upon decoding the congestion situation, the congestion control access gateway 200a broadcasts a congestion notification message and a congestion control message to the USNs 101 to 104 in order to balance load of the congestion data.

At step 306, after detecting the congestion situation, the congestion control access gateway 200a generates a congestion situation detection profile as a result of the congestion situation detection based on the received data.

At step 307, the congestion control access gateway 200a transmits the generated congestion situation detection profile to the neighboring congestion control access gateway 200b.

As the generation of the congestion situation detection profile is completed, the congestion control access gateway 200a performs, at step 308, priority queuing of data produced in the congestion situation based on both the generated congestion situation detection profile and the predetermined service classes.

At step 309, the congestion control access gateway 200a determines a destination of data popped from the priority queue using the congestion situation detection profile and routes the data to a corresponding service through the broadband convergence network 141.

Then, at step 310, the congestion control access gateway 200a periodically determines whether or not the congestion situation has been released. If the congestion situation still exists, the congestion control access gateway 200a returns to step 308, otherwise it terminates the congestion situation mode and switches to a non-congestion situation mode at step 311.

Figure 4:
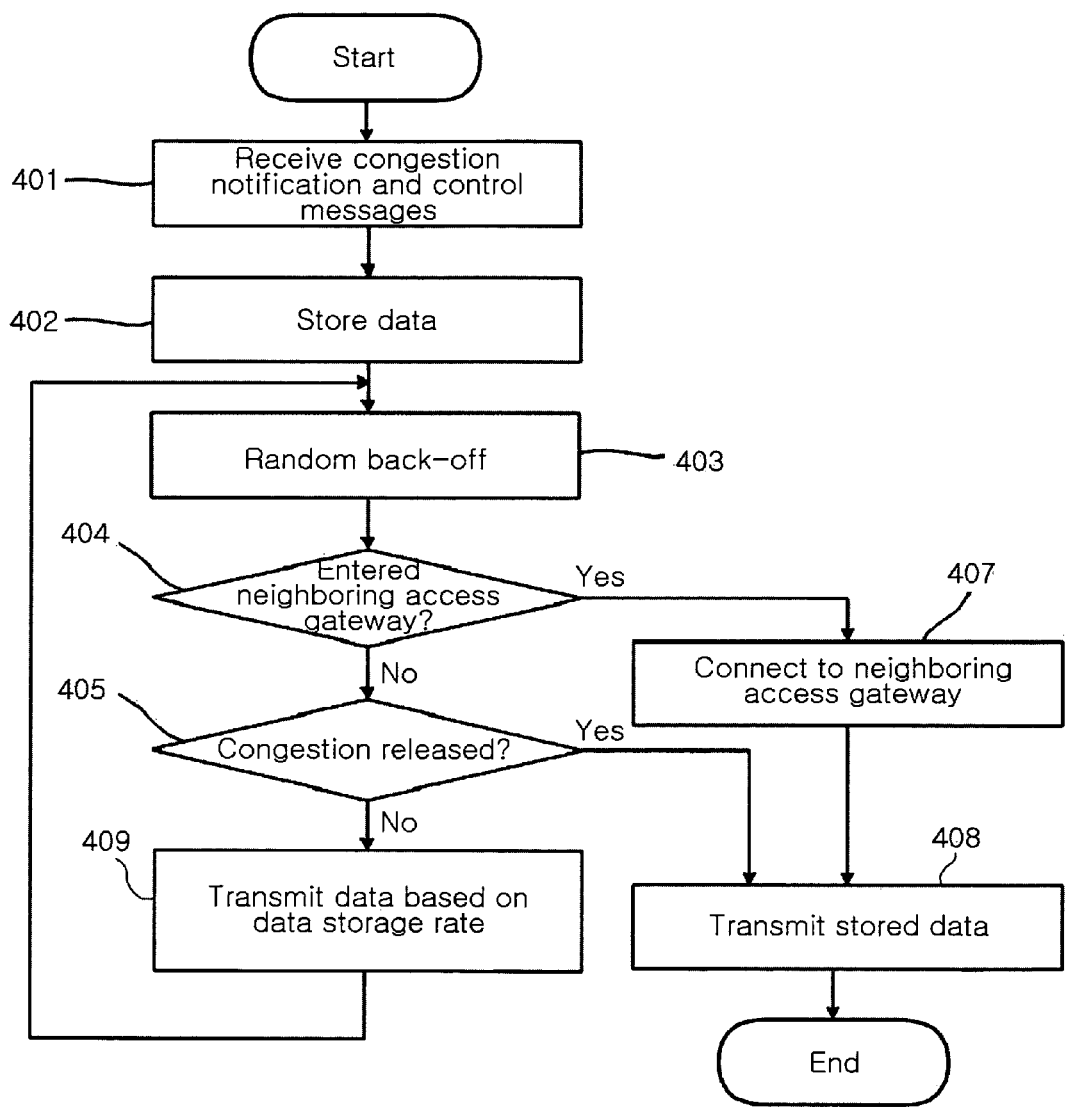
FIG. 4 is a flow chart illustrating how a terminal or a sensor having a storage therein processes data in a congestion situation according to an embodiment of the present invention.

With reference to FIG. 4, a description will now be given of how the terminal operates to receive the congestion notification message and the congestion control message which the congestion control access gateway has generated as described above. The following description will be given with reference to the terminal 111 located at the ubiquitous sensor network (USN) 102 as shown in FIG. 1.

FIG. 4 is a flow chart illustrating how a terminal or a sensor having a storage therein processes data in a congestion situation according to an embodiment of the present invention.

The terminal 111 attempts to balance load of congestion data upon receiving a congestion notification message and a congestion control message that are broadcast by the congestion control access gateway 200a after a congestion situation has occurred.

As shown in FIG. 4, at step 401, the terminal 111 receives the congestion notification message and the congestion control message. Then, at step 402, the terminal 111 stores data, which is sensed and input after the reception, in the storage. At step 403, the terminal performs random back-off of each service class, i.e., sets a random back-off time and waits for a corresponding period.

After performing the random back-off, the terminal 111 determines, at step 404, whether or not it has moved from a service area of the congestion control access gateway 200a to a service area of the neighboring congestion control access gateway 200b. If the terminal 111 has not moved to the service area of the neighboring congestion control access gateway 200b, the terminal 111 determines, at step 405, whether or not the congestion situation has been released. When the congestion situation has been released, the terminal 111 transmits the stored data at step 408. If the congestion situation still exists, the terminal 111 transmits, at step 409, part of the stored data, taking into consideration the data storage rate and the data sensing and input rate of the terminal 111, so that no overflow occurs in the storage, and proceeds to step 403 to repeat the random back-off.

If it is determined at step 404 that the terminal 111 has moved to the service area of the neighboring congestion control access gateway 200b, the terminal 111 accesses the neighboring congestion control access gateway 200b and transmits the stored data at step 408.

Then, the neighboring congestion control access gateway 200b receives the stored data from the terminal 111 that has entered its service area and determines a suitable routing path based on the situation detection profile and the congestion situation detection profile received from the congestion control access gateway 200a and processes the data input in the congestion situation.

The above embodiments of the present invention perform congestion control in the following manner. Priority queuing of the data sensed in the congestion situation occurring in the ubiquitous environment, in which a variety of terminals and sensors randomly transmit variable-sized sensed data, is performed based on the situation detection profile and the service classes. In addition, the terminals and sensors temporarily store data input and sensed in the congestion situation in their storages and then connect to the congestion control access gateway (CC-uAGW), which has been released from the congestion situation, or to the neighboring CC-uAGW to transmit the stored data to the connected CC-uAGW. A destination of the data received from the Ubiquitous Sensor Network (USN) is determined based on the situation detection profile, and the received data is routed to the destination, thereby achieving congestion control.

As is apparent from the above description, the present invention provides a congestion control access gateway that detects a congestion situation and processes data received in the congestion situation based on a congestion situation profile. Thus, the congestion control access gateway can control congestion data produced in specific situations, thereby ensuring that the data is processed without loss.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A congestion control method for a congestion control access gateway that interfaces between a broadband convergence network and a ubiquitous sensor network including sensors and terminals, the method comprising:
   receiving data from the ubiquitous sensor network;
   when receiving the data, determining whether or not a congestion situation has occurred;
   when a congestion situation has occurred, detecting the congestion situation based on data received in the congestion situation;
   broadcasting a congestion notification message and a congestion control message in response to the detection of the congestion situation;
   generating a congestion situation detection profile based on the data received in the congestion situation to determine a reason as a result of the congestion situation being detected;
   performing a first priority queuing of the received data wherein the received data is ordered in queue based on both the congestion situation detection profile and predetermined service classes, and
   a second priority queuing when no congestion situation has occurred;
   determining a first destination of the data, which has been subjected to the first priority queuing, using the congestion situation detection profile, and routing the data to a corresponding service;
   when no congestion situation has occurred, performing situation detection based on the received data and generating a situation detection profile as a result of the situation detection,
   wherein the situation detection profile indicates that the access gateway interfaces between the broadband convergence network and the ubiquitous sensor network including the sensors and the terminals without the occurrence of the congestion situation; and determining a second destination of the received data using the situation detection profile, which has been subjected to the second priority queuing and routing the received data to a corresponding service, and wherein the first destination is different from the second destination.

2. The congestion control method according to claim 1, further comprising:

transmitting the congestion situation detection profile to a neighboring congestion control access gateway.

3. The congestion control method according to claim 1, further comprising:

when a congestion situation has occurred, detecting the congestion situation based on currently processed data; and performing priority queuing of the currently processed data based on predetermined service classes in response to the detection of the congestion situation.

4. The congestion control method according to claim 1, further comprising:

periodically determining whether or not the congestion situation has been released; and when the congestion situation has been released, terminating a congestion situation mode and switching to a non-congestion situation mode.

5. A method for a terminal to control a congestion situation occurring in a ubiquitous system including a plurality of congestion control access gateways that interface between a broadband convergence network and a ubiquitous sensor network including sensors and terminals, the method comprising:

receiving a congestion notification message and a congestion control message from a specific congestion control access gateway that has generated the congestion notification and control messages in response to detection of a congestion situation;

storing data produced in the congestion situation upon receiving the congestion notification message;

performing random back-off of each of a plurality of predetermined service classes upon receiving the congestion control message wherein the service classes include a real-time multimedia data class, a non-real time multimedia data class, a real-time sensed data class, a non-real time sensed data class, and an Internet data class;

transmitting part of the stored data based on a rate at which the data is stored such that the rate in which the data is stored does not exceed a transmission period of the part of the stored data being transmitted to a first destination; and upon receiving a situation detection profile generated when no congestion situation has occurred, transmitting data to a second destination, wherein the first destination is different from the second destination.

6. The method according to claim 5, further comprising:
transmitting the stored data when the congestion situation has been released.

7. The method according to claim 5, further comprising:
when entering a service area of a neighboring congestion control access gateway, connecting to the neighboring congestion control access gateway and transmitting the stored data to the neighboring congestion control access gateway.

8. A congestion control access gateway that interfaces between a broadband convergence network and a ubiquitous sensor network including sensors and terminals, the gateway comprising:

a first interface that interfaces with the ubiquitous sensor network and receives data therefrom;

a congestion detector that monitors the first interface to determine whether or not a congestion situation has occurred and, when a congestion situation has occurred, detects the congestion situation;

a situation detection processor that generates a congestion situation detection profile based on the data received in the congestion situation to determine a reason as a result of the congestion situation being detected;

a congestion controller that broadcasts a congestion notification message and a congestion control message in response to the detection of the congestion situation and transmits the congestion situation detection profile to a neighboring congestion control access gateway;

a priority queuing processor that performs a first priority queuing of the received data wherein the received data is ordered in queue using both the congestion situation detection profile and predetermined service classes, and a second priority queuing when no congestion situation has occurred;

a routing processor that determines a first destination of the data, which has been subjected to the first priority queuing, using the congestion situation detection profile, and routes the data to a corresponding service and determines a second destination of the received data using a situation detection profile generated when the no congestion situation has occurred, which has been subjected to the second priority queuing and routes the received data to a corresponding service, and wherein the first destination is different from the second destination, and wherein the situation detection profile indicates that congestion control access gateway interfaces between the broadband convergence network and the ubiquitous sensor network including the sensors and the terminals without the occurrence of the congestion situation; and a second interface that interfaces with the broadband convergence network and transmits the routed data thereto.

9. The congestion control access gateway according to claim 8, wherein the first interface transmits the congestion situation detection profile to a neighboring congestion control access gateway, and the neighboring congestion control access gateway receives data stored in a terminal that has entered a service area of the neighboring congestion control access gateway.

10. The congestion control access gateway according to claim 8, wherein the congestion controller determines whether or not the congestion situation has been released and, when the congestion situation has been released, the congestion controller terminates a congestion situation mode and switches to a non-congestion situation mode.

11. The congestion control access gateway according to claim 8, wherein, when no congestion situation has occurred, the congestion detection processor performs situation detection based on the received data and generates a situation detection profile as a result of the situation detection.

12. The congestion control access gateway according to claim 8, wherein, when the congestion situation has occurred, the priority queuing processor performs priority queuing of currently processed data using the predetermined service classes.

* * * * *